(12) United States Patent
Fodor et al.

(10) Patent No.: US 8,339,964 B2
(45) Date of Patent: Dec. 25, 2012

(54) METHOD AND APPARATUS FOR SOLVING DATA PACKET TRAFFIC CONGESTION

(75) Inventors: Gabor Fodor, Hässelby (SE); Reiner Ludwig, Hürtgenwald (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 716 days.

(21) Appl. No.: 12/158,946

(22) PCT Filed: Dec. 23, 2005

(86) PCT No.: PCT/SE2005/002048
§ 371 (c)(1),
(2), (4) Date: Jun. 23, 2008

(87) PCT Pub. No.: WO2007/073271
PCT Pub. Date: Jun. 28, 2007

(65) Prior Publication Data
US 2008/0304416 A1 Dec. 11, 2008

(51) Int. Cl.
*H04L 12/26* (2006.01)
(52) U.S. Cl. .................................... 370/237

(58) Field of Classification Search ............ 370/230, 370/519, 465, 237; 455/452.1, 456
See application file for complete search history.

(56) References Cited

U.S. PATENT DOCUMENTS

| | | | |
|---|---|---|---|
| 6,564,061 B1 * | 5/2003 | Guo et al. | 455/452.1 |
| 7,095,754 B2 * | 8/2006 | Benveniste | 370/465 |
| 7,515,616 B2 * | 4/2009 | Yi et al. | 370/519 |
| 2003/0063564 A1 * | 4/2003 | Ha et al. | 370/230 |
| 2003/0162549 A1 * | 8/2003 | Carlsson | 455/456 |
| 2004/0213265 A1 | 10/2004 | Oueslati et al. | |

FOREIGN PATENT DOCUMENTS
WO WO0237774 A2 5/2002

* cited by examiner

*Primary Examiner* — Mark Rinehart
*Assistant Examiner* — Gbemileke Onamuti

(57) ABSTRACT

The present invention relates to data packet traffic congestion solving mechanism in a node of a Radio Access Network (RAN), said mechanism is capable of blocking the transmission of data packets between a user terminal (UT) and said node in both uplink and downlink directions, if a created blocking table indicates for a scheduler that said user terminal has been determined to have been idle for more than a predetermined time.

15 Claims, 4 Drawing Sheets

METHOD AND APPARATUS FOR SOLVING DATA PACKET TRAFFIC CONGESTION

TECHNICAL FIELD

The present invention relates to traffic congestion problems in Radio Access Networks. More specifically, the present invention relates to a method and a node for solving data packet congestion problems in a Radio Access Network.

BACKGROUND OF THE INVENTION

As $3^{rd}$ generation (3G) mobile systems continue to evolve, there is a growing market interest to support high bit-rate multi-media services. At the same time, 3G operators face a strong competition from non-conventional business models employing, for instance, IEEE 802.X based technologies that provide wireless access to Internet Protocol (IP) based multimedia services (IMS) or to the Internet.

Therefore, mobile operators are interested in augmenting their evolving radio access networks (RAN) with a technology that provides them with the ability to offer broadband IP based services, including TCP (Transmission Control Protocol) and UDP (User Datagram Protocol) based applications. In this document we will collectively refer to these high bit rate RAN:s beyond the existing 3G radio access technologies as "4G RAN":s. Following documents are determined as close prior art:
[1] WINNER Project, "Description of identified new relay based radio network deployment concepts and first assessment by comparison against benchmarks of well known deployment concepts using enhanced radio interface technologies", IST-2003-507581 D3.1
[2] C. Barakat, P. Thiran, G. Iannaccone, C. Diot, P. Owezarsid, "A Flow based model for Internet backbone traffic", http://www.imconf.net/imw-2002/imw2002-papers/123.pdf
[3] CISCO Document, Configuring QoS, http://www.cisco.com/univercd/cc/td/doc/product/lan/cat4000/12_2_25/conf/qos.pdf A key observation is that 4G can advantageously be designed exclusively for IP-based applications. That is, we can assume that the 4G RAN only interfaces to the cellular operator's packet switched domain and all applications running over 4G are IP based. It follows that it further can be assumed that all applications are rate adaptive, including TCP applications and also many of the UDP applications, including VoIP (Voice-over-IP) applications employing rate adaptive coders.

A number of features have been listed for 4G RAN:
Exclusive Focus on IP-Based and Rate-Adaptive Applications
Only One Shared Traffic Channel per Cell
Instant Access to all of the Currently Available Bandwidth
No Support for Session-Based Admission Control & Resource Reservation (Single Bearer Concept)
No Distinction Between Real-Time, Quasi-Real-Time, and Non-Real-Time Applications
Lossless HARQ (Hybrid Automatic Repeat Request) with Bounded Retransmission Delays per IP Packet
Congestion Control Based Purely on End-to-End Mechanism (Flow-Class Queueing and Active Queue Management)
4G RAN Provides Per-Hop QoS (a la DiffServ) Through Different Service Classes
Policy-Based Scheduling Between Service Classes A key requirement on 4G systems is that the system complexity must be kept as low as possible. This applies particularly to Quality of Service (QoS) mechanisms that aim to provide some basic level of service differentiation as well as to ensure system stability at congestion conditions.

The Internet does not provide any end-to-end QoS and, of different reasons, is unlikely to ever do so. The per-hop model of Differentiated Services (DiffServ, DS) is an attractive mechanism to provide QoS between edge nodes of a network, and therefore it is well suited for the purpose of providing QoS in a 4G RAN. DiffServ (according to the standard documentation IETF RFC2475) has been partly successful in the Internet where it is mainly implemented within the domain of one operator. DiffServ uses the 6-bit DSfield in the IP header to mark the service class of an IP packet. A big advantage with this approach is that IPsec (IP security mechanism) does not encrypt the DS field. IPsec is increasingly used, e.g., for corporate access. Therefore, the 4G RAN is envisaged to implement to provide different service classes. The service class of an IP packet is marked in the DS field. It is a 4G operator's freedom to decide how many service classes to be supported.

Hence, the term Quality of Service (QoS) is defined as: "A network is said to support QoS if it is able to offer different and differentiable levels of service Quality over a shared infrastructure".

With this definition of QoS, it should be noted that when the load on the network is low and all user terminals (UT) have sufficient coverage (sufficiently high receiver level) then there is no difference between the different service classes. In those situations the 4G RAN can transport data faster (without IP packet losses and sufficiently low delays) then the applications currently used by all UTs in a cell can deliver the data.

An important feature that 4G needs to support is a mechanism by which an operator can associate certain QoS levels with applications provided by the operator through its service network or by $3^{rd}$ parties chosen by the operator. The services may be divided into "public" and "private" service classes. Public service classes are offered publicly and can be subscribed to by 4G users. The idea is that each UT belongs to exactly one public service class, e.g. one of "gold", "silver" or "bronze". The public service class gold could be tied to the user's subscription. Private service classes are not available to 4G users, but can only be set by a 4G operator. The idea is that packets that belong to an application chosen by the operator are assigned to a private service class, hereafter denoted as platinum. In that way a 4G operator can ensure that those packets get differentiated treatment in the 4G RAN, e.g. priority over packets of public service classes. With this approach it will be possible to emulate guaranteed bit rates that can be associated with a specific service chosen by the 4 G operator. This requires an appropriate network dimensioning and a corresponding policy for handling the different service classes (priorities, minimum bit rates, etc.).

Consider the QoS supporting system architecture of FIG. 2. As the overall traffic load in the system increases, the system's congestion level starts increasing and eventually only platinum user traffic can be served (due to the second level scheduling mechanism).

When the traffic load from platinum users alone reaches high load regions, there is a need to prioritize some platinum users. That is, there is a need for an algorithm that determines which platinum users to schedule over the radio interface when the system is congested to the extent that not all platinum traffic can be scheduled.

This problem is non-trivial because the system does not differentiate two users (two UT:s) that belong to the same priority class (e.g. platinum). As in FIG. 2, the second level scheduler may be associated with an interclass policy and it may also keep track of the age of outstanding IP packets. These pieces of information are however not sufficient, since these do not allow to distinguish between users of the same class (e.g. platinum) that have outstanding IP packets with the same age.

Shortly put, there is a need for an algorithm that determines which UT's sessions should not receive any scheduling resources at the MAC level in the case of congestion. This problem is referred to as the intra-class UT blocking problem.

BRIEF DESCRIPTION OF THE INVENTION

The proposed solution to said problem allows to block UT:s from accessing the radio interface (Down-Link (DL) and Up-Link (UL)) without relying on explicit session- and flow-based signalling. In the DL it does not require any signalling at all (not even on the medium access control (MAC) layer).

This invention can be seen as an important puzzle piece in devising a low complexity yet efficient QoS mechanism that is applicable for rate adaptive IP based applications over wireless links. The basic idea of the proposed QoS mechanism is to take advantage of the 4G specific assumptions (high bit rate, low congestion probability, adaptive IP based applications) and provide service differentiation without session level signalling and admission control. Such QoS mechanism is arguably less application specific, requires minimum amount of state information and does not need pre-application QoS signalling and resource reservation.

The present invention relates to a traffic solving method according to claim 1. Different variations of the method are defined by the dependent claims 2-12.

The present invention also relates to a node according to independent claim 13. Said node comprises means for performing the invented method. Different embodiments of the node are defined in the dependent claims 14-20.

The merit of the current invention is that it overcomes an important problem that is related to such QoS mechanism, namely the problem of blocking some of the user terminals during high congestion situations without requiring session establishment and UT-RAN signalling procedures to perform admission control and resource reservation prior to user data transmission. As such, the proposed mechanism is required to ensure system stability when there is congestion in the network.

BRIEF DESCRIPTION OF THE DRAWINGS

The invention will in the following be described in more detail with reference to enclosed drawings, wherein.

DETAILED DESCRIPTION OF THE INVENTION

Figure 1:
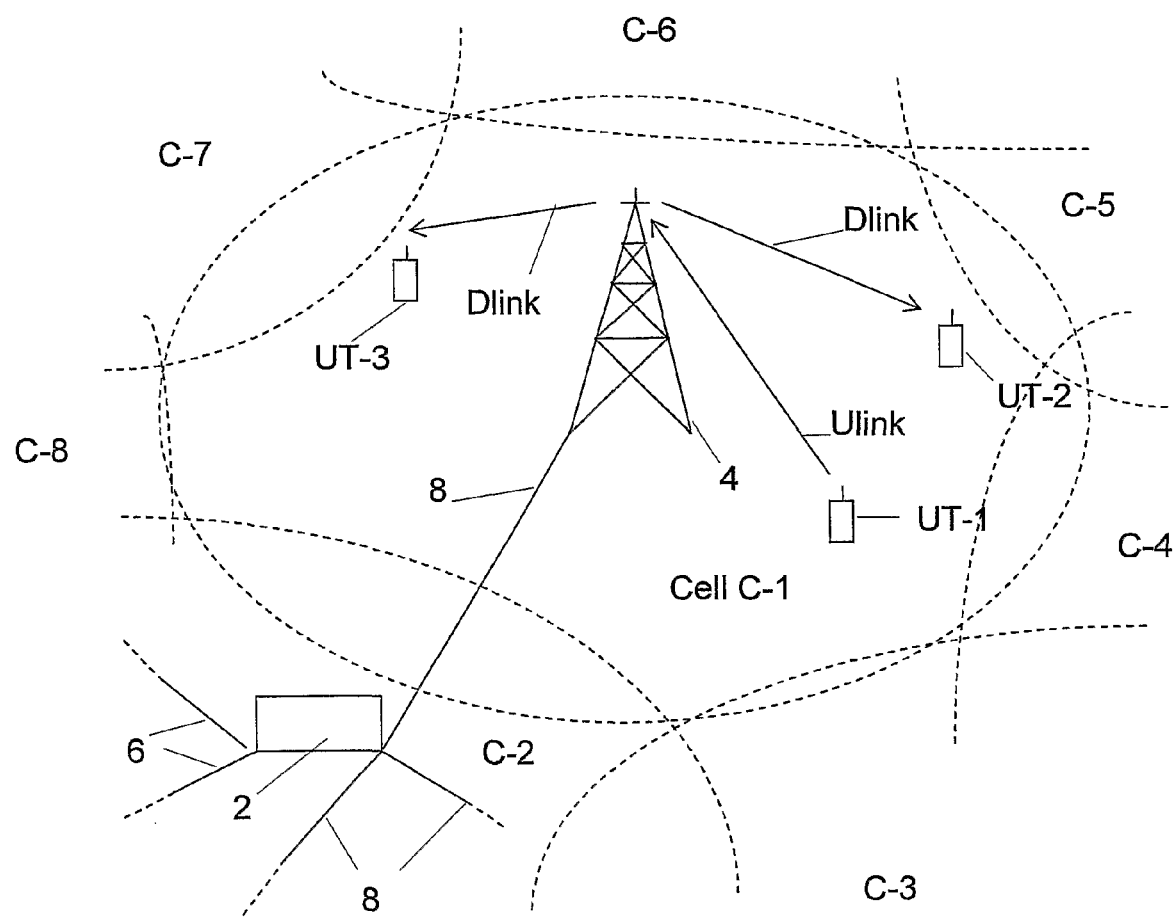
FIG. 1 is a block diagram schematically illustrating a cell and some functional elements in a Radio Access Network (RAN) for cellular radio communication.

FIG. 1 illustrates a Radio Access Network (RAN) for cellular radio communication, such as UMTS (Universal Mobile Telecommunications System). The ability to use a user terminal UT (UT-1, UT-2, UT-3, . . . ), e.g. mobile radio terminal, for radio communication purposes within a cell C (C-1, C-2, . . . ) is provided by a node 2, e.g. Radio Network Controller, (base station controller in GSM (Global System for Mobile communication)), etc, that is connected to another node 4 of the network, a base station antenna 4, that is strategically located in the cell for accomplishing best possible radio signal coverage (In UMTS terminology, a base station is usually denoted as a node B that is controlled by a RNC, however, in a more general sense the RNC may also be regarded as and denoted a node of a system or network). Each RNC node is usually controlling a number of cells and node Bs via a number of signal connections 8. In this schematic illustration, the base station antenna 4 is located in the centre of the cell, although other locations than the centre is possible. A base station antenna 4 comprises at least one antenna, omni directional or directional, connected to a radio transceiver arrangement (not shown). A user terminal UT and the RNC node are able to communicate with each other via the base station antenna 4 and the air interface in both directions, up-link (Ulink) from the user terminal UT to the base station antenna 4, and down-link (Dlink) from said base station antenna 4. The mobile radio telephone communication system comprises a Radio Access Network RAN that usually comprises a number of RNC nodes that are mutually connected via a number of connections 6 and even connected to other networks, such as a core networks, PSTN, ISDN, LAN, WLAN etc. The transceiver arrangement (not shown) is monitored and controlled by the radio network controller. The fact that the mobile radio communication system is described as a UMTS system should be regarded as a pedagogical simplification rather than a limitation of the scope of the invention. The invention is therefore not restricted to one mobile radio communication standard, on the contrary, the invention described below is applicable in any of the known mobile radio communication standards.

Figure 2:
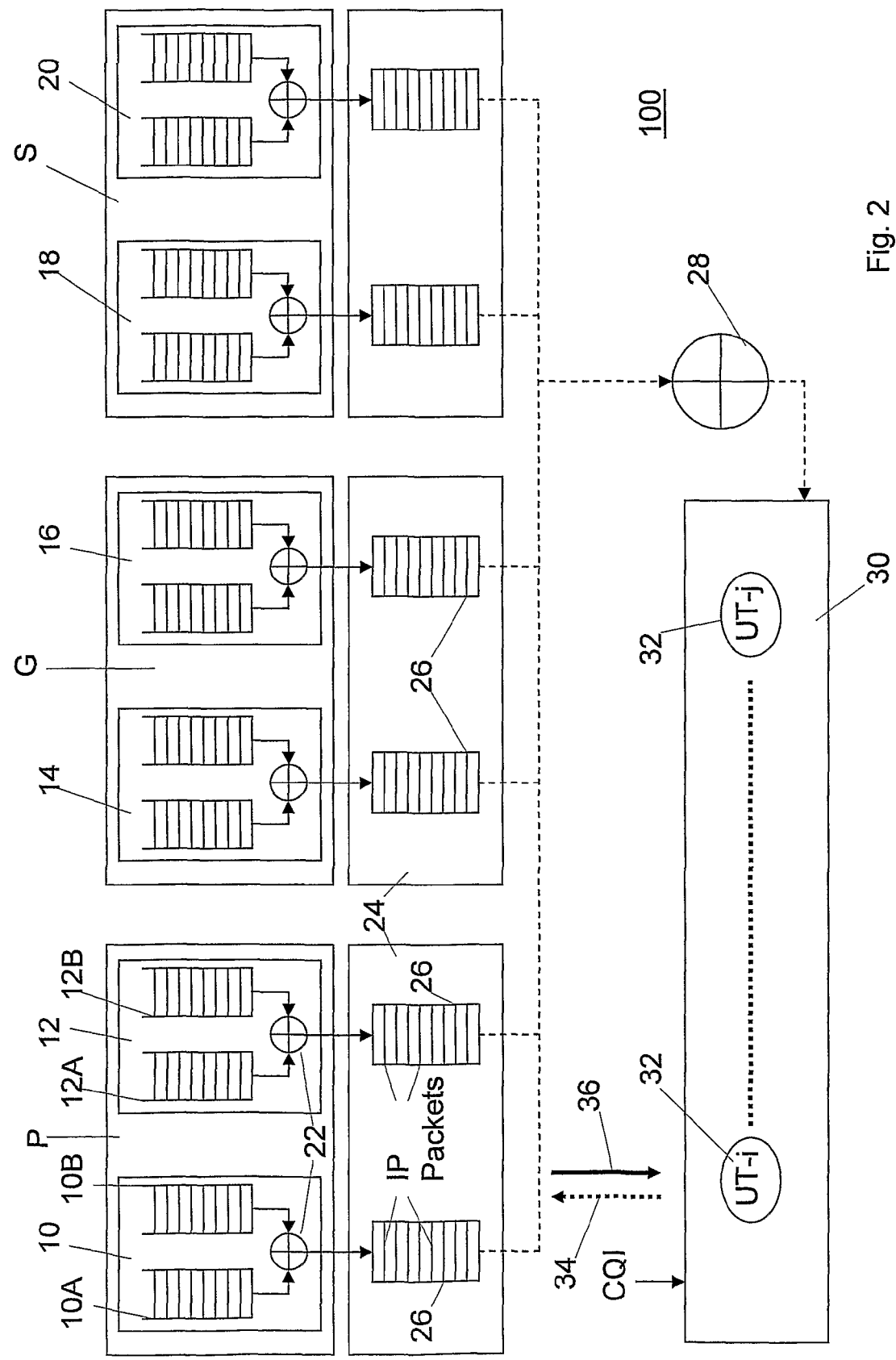
FIG. 2 is a block diagram showing schematically a configuration of a prior art scheduler architecture according to prior art.

FIG. 2 is a block diagram showing schematically a configuration of a prior art scheduler architecture design 100 according to the WINNER project [REFERENCE-1]. FIG. 2 is an embodiment for how the different elements for 4G QoS handling could be implemented in the downlink. This embodiment comprises two public service classes, gold (G) and silver (S), and one private service class, platinum P. The service class priority order is from highest service level to the lowest service level, platinum (P), gold G and silver (S). However, other class configurations are possible within the scope of this invention. A traffic situation involving N subscribers in the cell is assumed; K platinum subscribers, L gold subscribers, and (N-(K+L)) silver subscribers. Note that independent of its public service class, a user terminal UT can also belong to the platinum class when a corresponding application, e.g., a VoIP service provided from the 4 G operator's service network, is currently used.

It is preferred that all applications are rate-adaptive. Since rate-adaptive application has congestion control as a standard, explicit support for congestion control is not necessary to design into a 4G Radio Access Network (RAN). Instead, flow-based queuing and active queue management are preferably implemented in a 4G RAN [REFERENCE-2].

Like in 2G and 3G, there is at least one IP (Internet Protocol) packet queue 10A, 10B (12A, 12B, . . . ) per User Terminal (UT) 10 (12, . . . )(one in Down-Link (DL) in a node of the RAN and one Up-Link (UL) in the UT (not shown). This is a direct consequence of implementing a separate link layer per UT (as opposed to a link layer shared by all terminals like in the standard IEEE 802.11). Different application packet flows to or from the same UT are separated or isolated. Otherwise, a bulk data transfer could easily create head-of-line blocking and consequently poor quality for a concurrent VoIP session on the same UT. To avoid this, flow-based queuing, i.e. different flows or different classes of flows are queued separately, may be used. Flow class may be defined on the identical tuple of source and destination IP address.

Logically, the known QoS architecture design comprises three levels of schedulers located in the 4G network. The first scheduler 22 is associated with a user terminal and schedules competing packets from different applications. The second scheduler 28 selects a particular UT's queue and handles over the corresponding IP packet for the third level scheduler 30. This third level scheduler 30 is a MAC scheduler that selects one of the outstanding, waiting IP packets for MAC level scheduling.

QoS provisioning for applications running on a 4G user terminal (UT) is provided by three levels of schedulers. The functions of these levels will now be described in more detail.

There may be several applications 10A, 10B (12A, 12B; etc) running on a single 4G UT 10 (12, 14, 16, 18, 20), each with associated traffic pattern and QoS requirements. Conceptually, applications generate IP packets in queues in buffers that are typically managed by an operating system.

Associated with each UT, there is a scheduler 22 whose task is to determine which out of the outstanding packets waiting in the application queues should be served first. In this embodiment, a Weighted Round-Robin scheduler (WRR) is used, but other scheduler may as well be used giving a fair share of the aggregate bit rate per UT (per service class) to the different flow classes while accounting for differences in packet sizes. Alternatively, the user might be given control over such a scheduler. The latter solution would allow advanced users to overwrite default priorities for certain applications, e.g. for their favourite VoIP-Client. On this level, a mechanism for maintaining the IP queues is used. Active Queue Management (AQM) is a proven mechanism to efficiently maintain IP queues. It is supported by many state-of-the-art routers [REFERENCE-3]. AQM can either be operated with "packet drop" as the implicit congestion signal or with the Explicit Congestion Notification (ECN) (described in IETF RFC3168), where instead of dropping a packet, it is marked with "congestion experienced". That mark is then echoed by the receiving rate-adaptive application (e.g. TCP). The key features of AQM is to react (drop or mark packets) before the queue has become full in order to leave buffer space to absorb transient packet bursts, and to queue as many packets as needed to maximize end-to-end throughput, but as little as possible to minimize end-to-end delays.

At the next level 24 the 4G access point (AP) maintains a queue per UT. That is, the one IP packet that has been selected by the first level of scheduler 22 is placed into this per-UT queue. These logical queues 26 at the AP are the ones that have a Hybrid Automatic Repeat Request (HARQ) sender 24 association with their peer entities located at the user terminals (not shown) [REFERENCE-1]. The task of the second level of scheduler 28 is to determine which IP packet(s) out of the outstanding ones should be selected for MAC level scheduling 30. This scheduler may take into account inter-class policies (that is priority handling among the different service classes P, G and S) and also the age of the 1P packets that are waiting in the per-UT queues 26.

Scheduling between the different service classes P, G and S is what determines the level of QoS provided to any specific service class.

Scheduling within one service class determines how UTs of the same service class are treated with respect to each other, e.g., fairness based on number of bytes or packets sent, fairness based on amount of consumed radio resources, etc.

One scheduler, the Policy-based Scheduler 28, should perform the scheduling between service classes.

As far as possible, the operation of that scheduler should be determined by operator policies, i.e., as little functions, features, and policies, as possible should be hardwired into the scheduler by 4G standards or vendor-specific 4G implementations.

Below, a number of examples for scheduling policies are given that could be defined.

With a single private service class (platinum) a 4G operator can determine how much bandwidth per cell should be reserved to services provided from the 4 G operator's service network. This can (should) be made adaptive to the number of users actually using the service at a given point in time, the bit rate required by the service for full quality, etc.

With two public service classes (gold G, silver S), the 4 G operator can decide that the gold G class gets absolute priority which during peak traffic times may lead to the starvation of the silver traffic. Instead, a certain minimum bandwidth could be reserved for gold traffic; again adaptive based on the number of active (sending and/or receiving) UTs in the gold class.

Different fixed scheduling weights (proportional fairness with priorities) could be assigned to the different service classes.

Minimum bit rates could be assigned per service class potentially depending on the receiver signal strength of a particular UT. For example, a minimum of 2 Mb/s for platinum users at a receiver level of 3 or better, a minimum of 0.1 Mb/s for gold users at a receiver level of 4 or better, and no minimum for silver users.

In this design the Policy-Scheduler and the MAC-Scheduler 30 are kept as separate entities. That way the MAC-Scheduler 30 can operate independently focusing purely on multi-user gains through channel dependent scheduling.

The MAC-Scheduler is controlled from the Policy-Scheduler 28 through Send-Tokens 32 that the Policy-Scheduler assigns on request from the MAC-Scheduler.

Each Send-Token 32 belongs to one particular UT-i and is "valid" for the successful transmission of one L2-PDU (IP packet).

Apart from inter-class policies, the Policy-Scheduler 28 also needs to take the "age" of an IP packet into account. The idea is that each IP packet gets assigned a timestamp, e.g., the current system time, on entering the IP queue. The "older" a packet gets the higher its priority or weight becomme, and the higher its probability of getting scheduled by the Policy-Scheduler. We assume that a HARQ sender 24 always places the oldest L2-PDU (IP packet) retransmission in front of the re-/transmission queue, i.e., retransmissions always have priority over new transmissions.

The idea is that the MAC-Scheduler 30 always requests tokens 32 in a way that it always has a sufficient amount of tokens to its disposal to allow for sufficiently high multi-user gains.

At the same time the MAC-Scheduler must ensure that it can transmit the payload associated with all of the tokens 32 it holds within a small amount of time, e.g., in less than 10 ms. Otherwise, the MAC 30 could create head-of-line blocking and excessive delay. When the MAC-Scheduler schedules a token 32, it offers the corresponding UT a certain amount of chunks of a given channel quality (CQI) 34. The UT then decides how many of the chunks it wants to use and generates a matching forward error correction (FEC) fragment 36.

Subsequently, the MAC-Scheduler schedules the next tokens until it has "filled" a transmission frame (Frame Bits or MAC Protocol Data Unit). Like the Policy-Scheduler 28 maintains the age of a packet, the MAC-Scheduler needs to maintain the age of a token. This is to avoid starvation of the UT belonging to a particular token. Thus, the older a token becomes, the more likely it becomes scheduled by the MAC-Scheduler 30; even if at that time still only few chunks with good channel quality (CQI) exist.

Effectively, this means that the ultimate decision about if and when an IP packet is transmitted lies with the Policy BasedScheduler (PBS) 28, since the MAC scheduler sooner or later has to schedule the IP packets assigned to it. This also means that service classes are transparent to the MAC-Scheduler 30.

Figure 3:
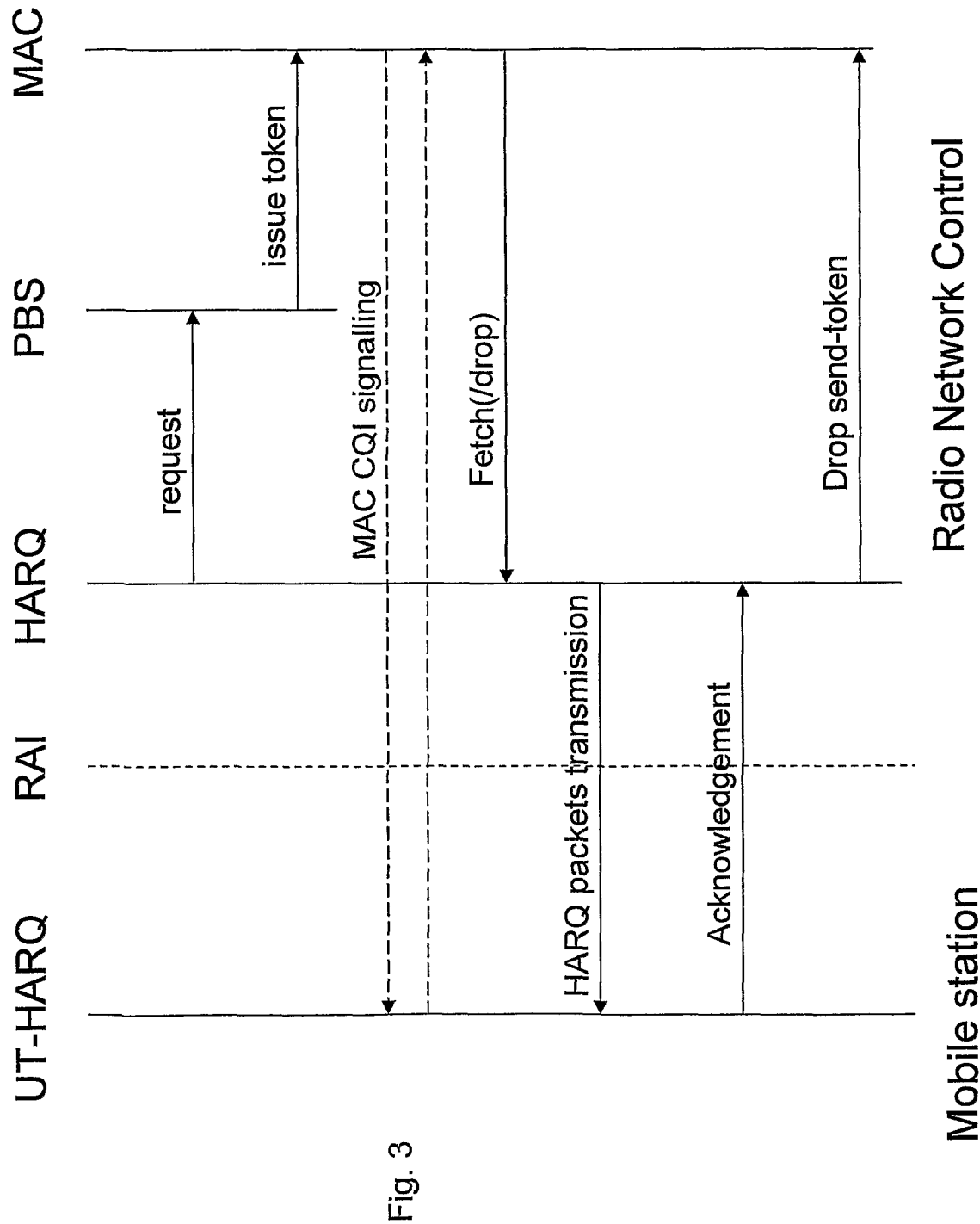
FIG. 3 is a command signalling scheme in the scheduler architecture according to the prior art.

The function of the above described 4G scheduler architecture for QoS handling will now be described with reference to the signalling scheme of FIG. 3.

IP Data Packets belonging to a certain application and addressed to an UT arrive to the first scheduler level 22. The IP packets, waiting to be selected for transmission by a HARQ-sender 24, are placed in a queue according to a per flow class queuing in a buffer 26. In the next step, the HARQ-sender 24 generates a send request to the next level scheduler 28, the PBS, which will set a IP packet time when the request was received. The PBS receives only one request per UT.

The PBS 28 checks inter-class policy and the age of the IP packets. If a request is accepted, the PBS issues a send-token to the CD-MAC (Channel Dependent Medium Access Controller). The UT is a candidate whose IP packets are waiting in the HARQ buffer to be transmitted over the radio interface to the corresponding peer HARQ in the UT. The issued send-token is stored in a memory space, candidate room, administrated and operated by the CD-MAC scheduler 30. The CD-MAC maintains peer-UT timers, which involve that each UT has its own timer.

It is therefore possible for the CD-MAC scheduler to monitor the age of each send-token, and to drop a token if said send-token exceeds a pre-determined age.

Said MAC scheduler 30 is token controlled and there is only one send-token per UT waiting to be served. A send-token stores information about its UT candidate. As the CD-MAC knows which UTs are candidates, the MAC checks the radio channel quality, CQI, of each UT represented in the candidate room. One UT that is contacted by the MAC responds by setting Forward Error Correction (FEC redundancy in correspondence to the channel quality (the better channel quality, the less the required FEC redundancy bits). The MAC scheduler 30 communicates directly with the HARQ senders 24 (without informing the PBS) and sets the FEC level due to the measured and determined CQI. If the MAC 30 has been able to communicate with an UT, the MAC sends a "Fetch HARQ packet"-command including the necessary FEC level to said HARQ sender. On the contrary, if the UT is determined to be unreachable, the MAC 30 sends a "Drop HARQ packet"-command to the HARQ sender in question.

If the HARQ sender in question receives a "Fetch HARQ packet"-command, the HARQ provides the IP packets with a HARQ header involving the current FEC level for the channel. The HARQ sender transmits the HARQ packets to the corresponding peer HARQ in the UT. When said peer HARQ successfully receives the data packets, it returns an acknowledgement back to its peer HARQ in the RNC. When the HARQ has received the acknowledgement, the HARQ sends an "Acknowledgement received"-indication to the MAC, which will drop the send-token in the candidate room.

In some situations, it will become necessary to select among users belonging to the same class. This problem is not addressed in the above known architecture.

This intra-class scheduling problem arises when the schedulers and the radio communication interface are unable to serve all incoming IP packets belonging to the same class. Accordingly, this involves that the data packets will have to queue too long in the system. The queues will over-flow. This situation is called traffic congestion. It is therefore necessary to select and give precedence to some UTs over other UTs within the same class. This is called intra-class selection. Inter-class selection, i.e. selection between UTs from different service classes, is provided for by the operator in the traffic policy integrated in the Policy Based Scheduler 28.

In prior art systems, this problem is removed by the use of the Admission Control. However, the Admission Control involves signalling over the radio interface. Signalling will limit the available radio resource and bandwidth. Therefore, admission control is not necessarily provided for in the proposed 4G system according to the Winner project [REFERENCE-1], and said system lets each user start up and start transmitting data packets. An invented intra-class selection mechanism avoiding radio signalling or making use of a strictly limited radio signalling is therefore of great interest.

Figure 4:
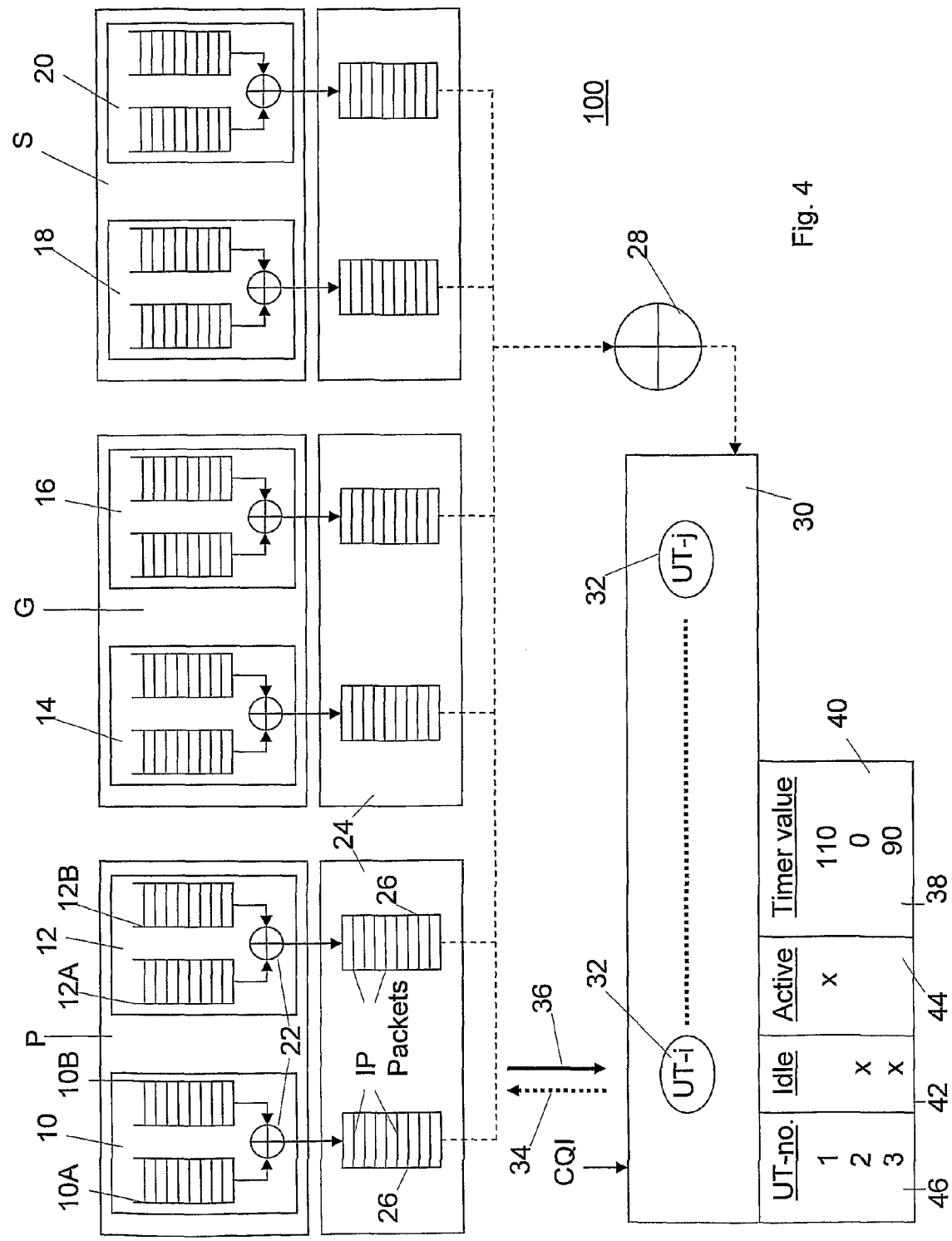
FIG. 4 is a block diagram showing schematically a configuration of a scheduler architecture according to the invention.

A possible solution is random selection of UTs within a class. However, in the following a solution of the selection problem according to the invention will be described, with reference to FIG. 4. Many details of the architecture have already been described above in connection with FIG. 2, and common details have therefore the same reference number.

The invention is a traffic congestion solving method comprising a blocking mechanism that involves that the Channel Dependent MAC scheduler 30. The CD-MAC maintain peer-UT timers 38, which involve that each UT 46 has its own timer. Further, a CD-MAC scheduler registers existing UTs in the cell in a TABLE 40, even denoted as blocking table.

The invented mechanism will start at congestion or congestion warning and comprises the step of classifying different UTs as ACTIVE 42 or IDLE 44, and the step of storing this information in a blocking table 40 comprising as many TIMERS 38 as there are UT:s in the system. The blocking table 40 is maintained by the Channel Dependent MAC Scheduler, when congestion or congestion warning is present. The blocking table 40 is a registry over all UT:s that is currently in the system and it maintains information about which UT:s are active or inactive. The information in the cell about the existing UT:s in the cell is collected from the send-tokens, which store UT information besides the age of token timer information.

During congestion or congestion warning, the MAC scheduler takes into account both this piece of information and the CQI information when selecting a HARQ packet for transmission over the radio interface. Once the UT:s are associated with an ACTIVE/INACTIVE state, this piece of information can be used by the MAC scheduler. In order for this ACTIVE/INACTIVE state information to be maintained, there is a need for a mechanism that classifies UT:s as ACTIVE/INACTIVE and ensures that this state information is kept updated in the BLOCKING TABLE 40 as long as the congestion or pre-congestion situation exists.

Congestion Detection:

The MAC scheduler 30 and the PBS scheduler 28 will be able to detect congestion and/or a congestion pre-state. The node is therefore provided with congestion monitoring means, which is possible to implement in computer software or hardware. When the system is very close to congestion, user terminals belonging to lower service classes, e.g. gold or silver, may already be totally blocked from transmitting data packets.

To be able to determine a congestion pre-state, or congestion warning state, it is necessary to define a congestion level. The congestion level could be defined as the ratio between number of incoming send requests from the HARQs per time unit, i.e. incoming rate, and the total down link capacity per time unit, or the out-going rate of packets, will exceed a pre-determined threshold value. Another useful congestion level definition is the sum of send-tokens in the candidate store in the MAC scheduler will reach a critical number. Further one usable definition of beginning congestion or actual congestion is that the time-sum of all send-token timers in the candidate store exceeds a pre-set time value threshold, e.g. 10 ms. When the congestion warning mechanism detects a congestion warning state or an actual congestion, the MAC scheduler is able to create said described blocking table.

Classification Algorithm:

At congestion or congestion warning state, each UT in the candidate store is classified as IDLE in the blocking table 40.

When the MAC scheduler schedules a HARQ packet for transmission it awaits the successful transmission of the packet over the radio interface. The MAC scheduler drops the send-token after the HARQ sender algorithm has successfully completed transmission of the current HARQ packet. Once a HARQ packet has been successfully transmitted, the MAC Scheduler changes the corresponding UT:s entry in the blockdng table 40 from IDLE to ACTIVE. It also sets the TIMER of this UT to a large positive value N.

After each successfully scheduled HARQ packet, the MAC Scheduler decrements N for each UT, except for the one UT whose packet has just been scheduled. When a UT:s TIMER reaches zero (i.e. N becomes zero), its status is again classified as IDLE. Alternatively, N is decremented after a predefined amount of time irrespective of the scheduled HARQ packets. It is also important to realise, that it is not possible to classify an UT as idle or active by only looking at the age of one of the send-tokens belonging to an UT. It is necessary to consider all send-tokens of an UT and if all send-tokens are too old to be transmitted, the UT is considered to be IDLE.

Blocking Mechanism:

At congestion, the MAC Scheduler 30 drops send-tokens and corresponding HARQ Packets whose UT is currently classified as IDLE. Thereby, ACTIVE UT:s have a higher probability that their HARQ packets get scheduled. The above algorithm provides a simple means to make an adaptive differentiation between ACTIVE and IDLE users during congestion periods. In broad terms, the system should be dimensioned such that such congestion periods should be rare. That is, during normal and even "lighter" congestion periods the service class based differentiation should be sufficient to differentiate between users and to preserve system stability. In the rare case, when the platinum users alone overload the system, there is however a need to make intra-class differentiation possible. It is during such severe congestion periods (exceptionally many call initiations within a cellular cell within a short time interval, referred to as the 'New Year's Eve" phenomenon) that the current invention becomes applicable. Typically, the system load increases from a "normal" level to the extreme congestion level gradually.

Consider the situation when there are no platinum users in the system. The gold and silver users however generate a traffic load that brings the system into a severely congested state. The problem now becomes to differentiate between gold users, much the same way as it was described for platinum users. The described intra-class selection is applicable for other service classes than the described "platinum users".

The above described embodiment of the blocking algorithm was described in the down-link (forward link) direction, from the RAN node of the cell to the UT.

However, the same functionalities and entities are present in the uplink (reverse link) as in the downlink case. In the user terminal, the IP packets will be handled by a HARQ and organized in at least one queue, and the IP packets will be waiting to be sent to the peer-HARQ. The scheduling control is handled by the base station (or radio network) controller, i.e. the BSC/RNC.

The uplink MAC scheduler does not have global knowledge over the state of all of the UTs' queues. However, the only difference between the downlink case and the uplink case is that the commands communicated in the control plane between the HARQ senders and the uplink PBS and the uplink MAC scheduler will be transmitted over the air interface instead of internal in the RNC node.

The present invention is also a node 2, e.g. Radio Network Controller, Base Station Controller, etc, in a Radio Access Network (RAN) for cellular radio communication. Said node 2 is signal connected to means, e.g. transceiver means, base station antenna 4, etc, for transmitting and receiving data packets (IP-packets) over the air interface between said node 2 and a number of user radio terminals UT (UT-1, UT-2, . . . ) within the cell area C-1. Said node 2 comprises a channel dependent scheduler 30 for monitoring and controlling UT scheduling due to Channel Quality Identification (CQI) and stored data packet information 32, e.g. tokens, belonging to data packets waiting to be selected for transmission to or from identified and addressed user terminals UT. Said node 2 comprises a number of means that provide the capability to perform the invented method for solving traffic congestion, which in the following will be presented.

The node 2 comprise means for creating a table 40, hereafter denoted as blocking table, comprising those of said user terminals that belongs to the same service class (P, G, S, . . . ), when a state of traffic congestion has occurred or is close to occur. Further, the node 2 comprises means for maintaining said blocking table 40 as long as said congestion state is present, preferably only as long as said congestion state is present. Furthermore, the node 2 comprises means for blocking the transmission of data packets between a user terminal UT and said node 2 in both uplink (Ulink) and downlink (Dlink) directions when the blocking table 40 indicates for said scheduler (30) that said user terminal (UT) has been determined to have been idle for more than a pre-determined time. The node 2 is further provided with means for allowing transmission of data packets between the user terminal and said node in both uplink and downlink directions when the blocking table indicates for said scheduler that said user terminal is determined to be still active. All the above mentioned means are preferably implemented as program instructions readable and processable by a controller, such as a computer, processor, central processing unit, micro-processor, etc, within or in connection to the node 2, e.g. in the radio network controller (RNC). The program instructions may be implemented in software or hardware.

According to one embodiment of the invention, the node 2 has also means for introducing in said blocking table 40 one entry for each user terminal UT, and for each user terminal one per-UT timer and means for setting each represented user terminal as IDLE and the corresponding per-UT timer to a pre-determined start value in said table.

Following listed means, defining different embodiments of the invention, are preferably implemented as program instructions readable and processable by a controller, such as a computer, processor, central processing unit, micro-processor, etc, within or in connection to the node 2, e.g. in the radio network controller (RNC). The program instructions may be implemented in software or hardware.

means for changing a user terminal entry 46 in the blocking table 40 from IDLE 42 to ACTIVE 44 if the corresponding data packet(s) has/have been successfully transmitted, e.g. that an acknowledgement has been received from the receiving party;

means for setting the counting value of the corresponding per-UT timer 38 to a pre-determined start value;

means for setting the counting value of the corresponding per-UT timer 38 to a pre-determined large positive start value N;

means for decrementing said counting value for each per-UT timer 38 for each successful transmission of data packets, except for the one UT whose data packet(s) just has/have been successfully transmitted;

means for decrementing said counting value for each per-UT timer 38 by a predetermined decrement value;

means for setting a user terminal as IDLE 42 when the corresponding per-UT timer 40 reaches a pre-determined stop value.

According to further one embodiment of the invention, the channel dependent scheduler 30 is a Medium Access Control (MAC) scheduler, which is capable of blocking data packet(s) waiting to be selected for transmission to or from an identified and addressed user terminal by dropping one or more corresponding send-tokens, representing stored data packet information belonging to said user terminal when said user terminal is indicated IDLE in the said table due to the fact that corresponding per-UT timer has reached the pre-determined stop value.

In further one embodiment, the node also comprises a policy-based IP/L2-PDU (Internet Protocol Layer 2 Packet Data Unit) scheduler 28 for scheduling accepted "send requests" generated by a sending entity 24 in the node 2 to said MAC scheduler 30 that is able to store said accepted send requests as send-tokens 32. Said sending entity 24 may be implemented as a Hybrid Automatic Repeated Request (HARQ).

It has now been described how the invented method and node comprising means for solving data packet congestion are capable of detecting and handling a congestion situation in a radio access network RAN without requiring session establishment and UT-RAN signalling procedures to perform admission control and resource reservation prior to user data transmission. The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A data packet traffic congestion solving method for cellular radio communication comprising a Radio Access Network (RAN), said network comprising at least one node, said node comprising a scheduler for monitoring and controlling scheduling of data packet transmissions with a plurality of user terminals (UTs), wherein the method comprises the steps of:

creating a table identifying those of said UTs that belong to the same service class (P) and identifying for each UT, a period of time that the UT has been idle, when a state of traffic congestion has occurred or is close to occurring, the table being readable by the scheduler;

maintaining said table as long as said congestion state is present; and providing priority to active UTs in the service class by blocking the transmission of data packets between a UT and said node in both uplink and downlink directions, when the table indicates for said scheduler that said UT has been determined to have been idle for more than a pre-determined time;

wherein the creating step, maintaining step, and blocking step are controlled by the scheduler, which is a Medium Access Control (MAC) scheduler; and wherein the MAC scheduler is capable of blocking data packets waiting to be selected for transmission to or from an identified and addressed UT by dropping one or more corresponding send-tokens, representing stored data packet information belonging to the identified and addressed UT, if the identified and addressed UT is indicated IDLE in the table due to the fact that a corresponding per-UT timer has reached a predetermined stop value.

2. The method according to claim 1, wherein said method further comprises the step of:

allowing transmission of data packets between the UT and said node in both uplink and downlink directions, when the scheduler-readable table indicates for said scheduler that said user terminal is determined to be still active.

3. The method according to claim 1, wherein said creating step includes the step of:

recording in said table, one entry for each UT, and for each UT, one per-UT timer.

4. The method according to claim 3, wherein said creating step includes the step of:

setting each represented user terminal as IDLE and the corresponding per-UT timer to a pre-determined start value.

5. The method according to claim 1, wherein said maintaining step includes the step of:

changing a UT entry in the table from IDLE to ACTIVE if the corresponding data packets have been successfully transmitted.

6. The method according to claim 5, wherein said maintaining step also includes the step of:

setting a counting value of the corresponding per-UT timer to a predetermined start value.

7. The method according to claim 6, wherein said maintaining step also includes the steps of:

setting the counting value of the corresponding per-UT timer to a predetermined positive start value N.

8. The method according to claim 7, wherein said maintaining step also includes the steps of:

decrementing said counting value for each per-UT timer for each successful transmission of data packets, except for the one UT whose data packets have been most recently successfully transmitted.

9. The method according to claim 7, wherein said maintaining step also includes the step of:

decrementing said counting value for each per-UT timer by a predetermined decrement value.

10. A node in a Radio Access Network (RAN) for cellular radio communication, said node comprising a scheduler for monitoring and controlling scheduling of data packet transmissions with a plurality of user terminals (UTs), wherein the node includes a processor configured to cause the scheduler to:

create a table identifying those of said UTs that belong to the same service class and identifying for each UT, a period of time that the UT has been idle, when a state of traffic congestion has occurred or is close to occurring, the table being readable by the scheduler;

maintain said table as long as said congestion state is present; and provide priority to active UTs in the service class by blocking the transmission of data packets between a UT and said node in both uplink and downlink directions, when the table indicates for said scheduler that said UT has been determined to have been idle for more than a pre-determined time;

wherein the scheduler is a Medium Access Control (MAC) scheduler; and wherein the MAC scheduler is configured to block data packets waiting to be selected for transmission to or from an identified and addressed UT by dropping one or more corresponding send-tokens, representing stored data packet information belonging to the identified and addressed UT, if the identified and addressed UT is indicated IDLE in the table due to the fact that a corresponding per-UT timer has reached a predetermined stop value.

11. The node according to claim 10, wherein the processor is also configured to cause the scheduler to allow transmission of data packets between a UT and said node in both uplink and downlink directions, when the scheduler-readable table indicates for said scheduler that said UT is determined to be still active.

12. The node according to claim 10, wherein the processor is also configured to record in said table, one entry for each UT, and for each UT, one per-UT timer.

13. The node according to claim 12, wherein the processor is also configured to set each represented UT as IDLE and the corresponding per-UT timer to a pre-determined start value in said table.

14. The node according to claim 10, wherein said node also comprises a policy-based IP/L2-PDU scheduler configured to schedule accepted send requests generated by a sending entity in the node to said MAC scheduler that is able to store said accepted send requests as send-tokens.

15. The node according to claim 10, wherein said sending entity is a Hybrid Automatic Repeated Request (HARQ) entity.

* * * * *

UNITED STATES PATENT AND TRADEMARK OFFICE
CERTIFICATE OF CORRECTION

PATENT NO. : 8,339,964 B2
APPLICATION NO. : 12/158946
DATED : December 25, 2012
INVENTOR(S) : Fodor et al.

Page 1 of 1

It is certified that error appears in the above-identified patent and that said Letters Patent is hereby corrected as shown below:

In Column 1, Lines 35-36, delete "Owezarsid," and insert -- Owezarski, --, therefor.

In Column 1, Line 41, delete "conf/qos.pdf" and insert -- conf/qos.pdf. --, therefor.

In Column 1, Line 67, delete "Classes" and insert -- Classes. --, therefor.

In Column 4, Line 53, delete "4 G" and insert -- 4G --, therefor.

In Column 5, Line 61, delete "1P" and insert -- IP --, therefor.

In Column 6, Line 14, delete "4 G" and insert -- 4G --, therefor.

In Column 6, Line 18, delete "4 G" and insert -- 4G --, therefor.

In Column 6, Line 47, delete "becomme," and insert -- become, --, therefor.

In Column 7, Line 10, delete "BasedScheduler" and insert -- Based Scheduler --, therefor.

In Column 7, Line 24, delete "a IP" and insert -- an IP --, therefor.

In Column 9, Line 29, delete "blockdng" and insert -- blocking --, therefor.

In Column 9, Line 59, delete "'New Year's" and insert -- "New Year's --, therefor.

Signed and Sealed this
Second Day of April, 2013

Teresa Stanek Rea
*Acting Director of the United States Patent and Trademark Office*